United States Patent
Akimoto et al.

[19]

[11] Patent Number: 5,960,767
[45] Date of Patent: Oct. 5, 1999

[54] COMBUSTION CHAMBER OF IN-CYLINDER DIRECT FUEL INJECTION ENGINE

[75] Inventors: Akira Akimoto, Tokyo; Toshio Yamaji, Kanagawa; Keiichi Kakizaki, Tokyo, all of Japan

[73] Assignee: Fuji Jukogyo Kabushiki Kaisha, Musashino, Japan

[21] Appl. No.: 08/796,482

[22] Filed: Feb. 10, 1997

Related U.S. Application Data

[63] Continuation-in-part of application No. 08/786,332, Jan. 23, 1997, abandoned.

[30] Foreign Application Priority Data

Feb. 9, 1996 [JP] Japan ..................................... 8-024331

[51] Int. Cl.[6] .................. F02B 3/00; F02B 5/00
[52] U.S. Cl. ..................... 123/298; 123/305; 123/301
[58] Field of Search ..................... 123/298, 301, 123/260, 302, 305

[56] References Cited

U.S. PATENT DOCUMENTS 5,140,958  8/1992  Kobayashi et al. ..................... 123/302
5,335,635  8/1994  Kadoi et al. ........................... 123/295
5,529,038  6/1996  Tsuchida .............................. 123/305
5,727,520  3/1998  Wirth et al. .......................... 123/301

*Primary Examiner*—Thomas N. Moulis
*Attorney, Agent, or Firm*—Smith, Gambrell & Russell, LLP; Beveridge, DeGrandi, Weilacher & Young Intellectual Property Group

[57] ABSTRACT

A combustion chamber of an in-cylinder direct fuel injection spark ignition engine having a pentroof composed of an intake side roof and an exhaust side roof, a piston, and a cylinder. The combustion chamber has a fuel injector provided between the intake side roof and the exhaust side roof inclined toward the exhaust side port, an intake port provided on the intake port side roof at an acute angle with respect to an extended line from the exhaust side roof so as to form a tumble flow of intake air along the exhaust side roof, a piston cavity with a curved surface formed on the top surface of the piston so as to reflect a fuel spray injected from the fuel injector together with that tumble flow in the direction of the intake side roof, and an electrode of a spark plug projected from the intake side roof so as just to collide with the tumble flow. The thus constituted combustion chamber is able to establish fuel injection finishing timing over a wide range according to the fuel injection amount, when stratified charge combustion is applied.

8 Claims, 12 Drawing Sheets

— TUMBLE RATE = 1.0 (PRESENT INVENTION)
—— TUMBLE RATE = -1.1 (INVERSE TUMBLE)
—·— TUMBLE RATE = 0.2 (NO TUMBLE)
—··— TUMBLE RATE = 2.0 (STRONG TUMBLE)
FIG. 11a  IGNITION
COMBUSTION FLUCTUATION (LARGE ↑ / SMALL ↓)
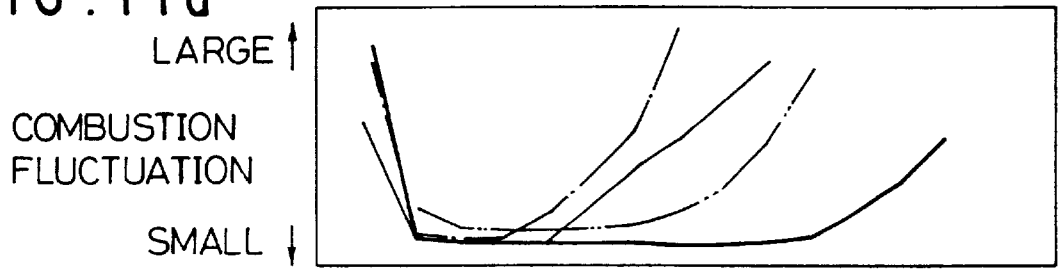
FIG. 11b
SMOKE DENSITY
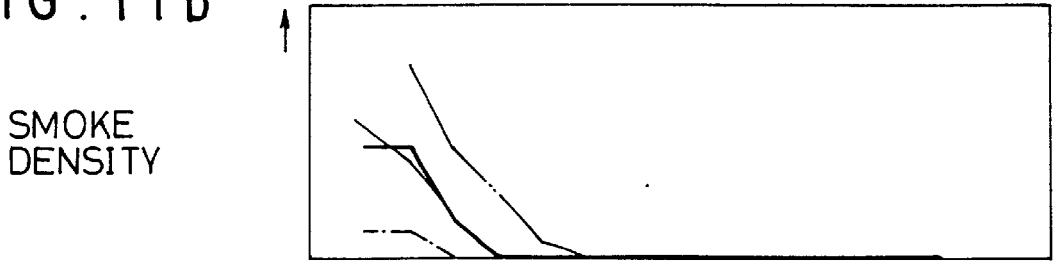
FIG. 11c
NOx
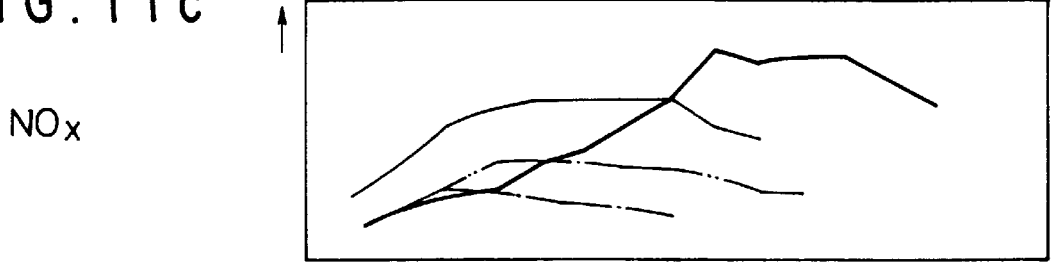
FIG. 11d
HC
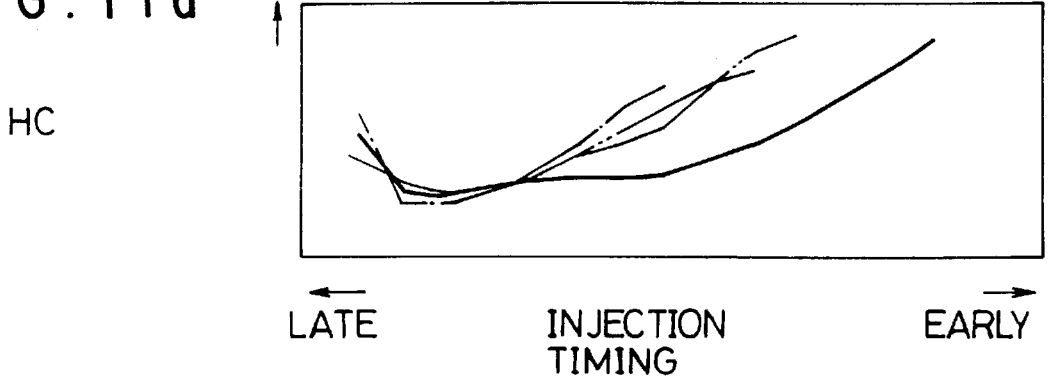
← LATE   INJECTION TIMING   EARLY →

COMBUSTION CHAMBER OF IN-CYLINDER DIRECT FUEL INJECTION ENGINE

CROSS REFERENCE TO RELATED U.S. APPLICATION

This present application is a continuation-in-part of U.S. Patent Application entitled Combustion Chamber of In-cylinder Direct Fuel Injection Engine filed on Jan. 23, 1997 as U.S. application Ser. No. 08/786,332, now abandoned which in its entirety is relied upon and incorporated herein by reference.

BACKGROUND OF THE INVENTION

1. Field of the Invention

The present invention relates to a construction of a combustion chamber for an in-cylinder direct fuel injection type spark ignition engine and more particularly to a construction of a cylinder head and a piston so as to readily produce a tumble flow and to a disposition of a spark plug and a fuel injector so as to optimize the combustion of fuel sprayed from a fuel injector.

2. Prior Arts

Generally, in this type of engine the combustion strategy can be selectively switched to either of two combustion strategies, a stratified charge combustion or a homogeneous combustion. The stratified charge combustion is obtained by accomplishing charge stratification at the later stage of the compression stroke and forming ignitable mixture gases around the spark plug. The homogeneous charge combustion is achieved by mixing fuel injected during the intake stroke with intake air.

As an example of the technology of the combustion chamber suitable for both stratified charge combustion and homogeneous charge combustion, an inventor of the present invention has proposed in Japanese Patent Application Laid-open No. Toku-Kai-Hei 6-42352 a fuel injector disposed in a vertical position at the top center of the combustion chamber and a cavity formed at the top surface of the piston in the counter direction to the injection direction of the fuel injector. Further, in this invention an electrode of the spark plug is disposed in the vicinity of the nozzle of the fuel injector.

According to this combustion chamber structure, with the stratified charge combustion, an end portion of fuel finishing injection immediately before the ignition timing is ignited by the spark plug or air-fuel mixtures impacted on and reflected by the cavity of the piston are ignited just at that ignition timing, whereby combustion stability is secured. On the other hand, with the homogeneous charge combustion, since fuel is started to be injected at a rather early stage of the intake stroke, homogeneous air-fuel mixtures can be obtained. Furthermore, according to this combustion chamber, since the fuel injector is provided in a vertical position at the top center of the combustion chamber, sprayed fuel is prevented from sticking to the cylinder wall surface, being able to thus avoid an adverse effect on combustion due to a so-called fuel quenching.

In order to obtain a stable combustion by forming ignitable air-fuel mixtures at the ignition point of the spark plug, a best finishing timing of fuel injection (BITI) where ignition is best has a characteristic shown by a broken line in FIG. 13. As understood by the characteristic line, the best fuel injection timing has a very weak correlation with respect to the fuel injection amount (or engine load) and consequently it is understood that the finishing timing of fuel injection is allowed to be kept constant with respect to the ignition timing.

However, as shown in FIG. 14, when the fuel injection timing gets advanced (rendered early) with respect to the ignition timing, since injected fuel is more premixed with air, HC and NOx emissions increase up to a given advance angle and then thereafter gradually decrease. On the contrary, when the fuel injection timing gets retarded (rendered late) with respect to the ignition timing, since injected fuel is burned in droplets, smoke emissions increase due to the lack of vaporization of fuel. Further, there is a tendency that the timing of smoke generation comes early as the fuel injection amount increases. Consequently, according to a best injection timing control (BITE), it is necessary from the aspect of emissions (smoke, CO, HC and NOx) that the fuel injection timing be advanced with an increase of the fuel injection amount (engine load).

As a result of this, in the stratified charge combustion, it is clearly understood that the BITI control focused on ignitability has a different control area from the BITE control focused on emissions countermeasures.

However, in the case of a combustion chamber wherein a flat cavity 1a is formed on the top surface of the piston as shown in FIG. 15, if the fuel injection (finishing) timing is established early, fuel sprayed from the fuel injector 2 is diffused around after being impacted on the cavity. As a result, fuel spray does not reach the neighborhood of the electrode 3a of the spark plug 3 and ignitable air-fuel mixtures can not be formed around the electrode 3a, leading to misfires or incomplete combustion. Therefore, in the case of an engine having a piston configuration like this, it is necessary to bring the injection finishing timing close to the ignition timing and to ignite an end portion of sprayed fuel. That is to say, it is understood that there is a limit in advancing the fuel injection (finishing) timing according to the fuel injection amount.

To solve this problem, there is an idea that the flat cavity 1a at the top surface of the piston is modified to a curved shape so that fuel injected from the fuel injector curls up along the curved surface of the cavity. This idea enables an ignitable air-fuel mixture to form around the electrode of the spark plug and to advance the fuel injection timing to some degree. However, by only this method relying upon the fuel spray configuration, it is still inadequate to secure ignitable air-fuel mixtures around the spark plug, when the fuel injection timing is further advanced.

Generally, in the case of stratified charge combustion, air-fuel mixtures around the electrode of the spark plug become overrich or cause a lack of vaporization as a mean air-fuel ratio comes near the stoichiometric air-fuel ratio, i.e., the injection amount is increased and this results in the generation of smoke, CO and HC emissions. This means that there is a given rich limit in the mean air-fuel ratio with stratified charge combustion. On the other hand, in the case of homogeneous charge combustion, since the overall mixture of gases is homogenized, there is also a given lean limit under which igniting is impossible.

It is known that the stratified charge combustion is suitable for low and medium load operations and homogeneous charge combustion is suitable for high load operations. Engine loads vary continuously during operation. Further, in the in-cylinder direct fuel injection engine air-fuel ratios are established variably according to changing engine loads. Therefore, in a case where the rich limit of the stratified charge combustion is located at a leaner side than the lean limit of homogeneous charge combustion, each time the operating area of engine varies, the air-fuel ratio is changed discontinuously, that is, when changing from stratified charge combustion to homogeneous charge combustion, a swift change occurs in the rich direction of the air-fuel ratio and when changing from homogeneous charge combustion to stratified charge combustion, a rapid change occurs to the lean side.

Thus, the situation that the air-fuel ratio is changed discontinuously each time the combustion strategy varies incurs deteriorated emissions and unacceptable driveability. This situation will be described with reference to FIG. 13.

In order to retain the continuity of the air-fuel ratio (assuming that the intake air amount is constant), if the injection amount with stratified charge combustion is established at the same level $P_1$ as the lean limit $P_3$ of homogeneous charge combustion, there occur inconveniences such as a generation of smoke emissions and an increase of CO emissions at the point $P_1$. On the other hand, if the injection amount is established at the rich limit $P_2$ so as to avoid these inconveniences when switching from stratified charge combustion to homogeneous charge combustion, the injection amount is increased from $P_2$ to $P_3$ abruptly and this brings about a discontinuity of engine output against engine load.

SUMMARY OF THE INVENTION

Accordingly, the present invention is intended to obviate the disadvantages of the known arts.

It is an object of the present invention to provide a combustion chamber for an in-cylinder direct fuel injection spark ignition engine capable of establishing a wide range of injection finishing timing with stratified charge combustion according to the fuel injection amount without an adverse effect on emissions and always obtaining a stable ignition performance.

It is a further object of the present invention to provide a combustion chamber capable of securing a continuity of engine load when switching from stratified charge combustion to homogeneous charge combustion so as to obtain a good driveability.

A combustion chamber of an in-cylinder direct fuel injection spark ignition engine comprises:

a fuel injector disposed between the intake valve side roof and the exhaust valve side roof and slightly inclined toward the exhaust valve side;

an intake port provided on an intake port side roof at an acute angle including zero degrees with respect to an extended line from an exhaust side roof so as to form a tumble flow of intake air along the exhaust side roof;

a piston cavity with a curved surface formed on the top surface of a piston so as to reflect fuel spray injected from a fuel injector together with that tumble flow in the direction of the intake side roof; and an electrode of a spark plug projected from the intake side roof so as just to collide with the tumble flow including fuel spray.

BRIEF DESCRIPTION OF THE DRAWINGS

Preferred embodiments will be described with reference to accompanying drawings in which:

FIG. 11a is a diagram showing a comparison of a rate of combustion fluctuation according to a rotational direction of tumble flow and a tumble rate;

FIG. 11b is a diagram showing a comparison of smoke density according to a rotational direction of tumble flow and a tumble rate;

FIG. 11c is a diagram showing a comparison of NOx emissions according to a rotational direction of tumble flow and a tumble rate;

FIG. 11d is a diagram showing a comparison of HC emissions according to a rotational direction of tumble flow and a tumble rate;

DETAILED DESCRIPTION OF PREFERRED EMBODIMENTS

Figure 1:
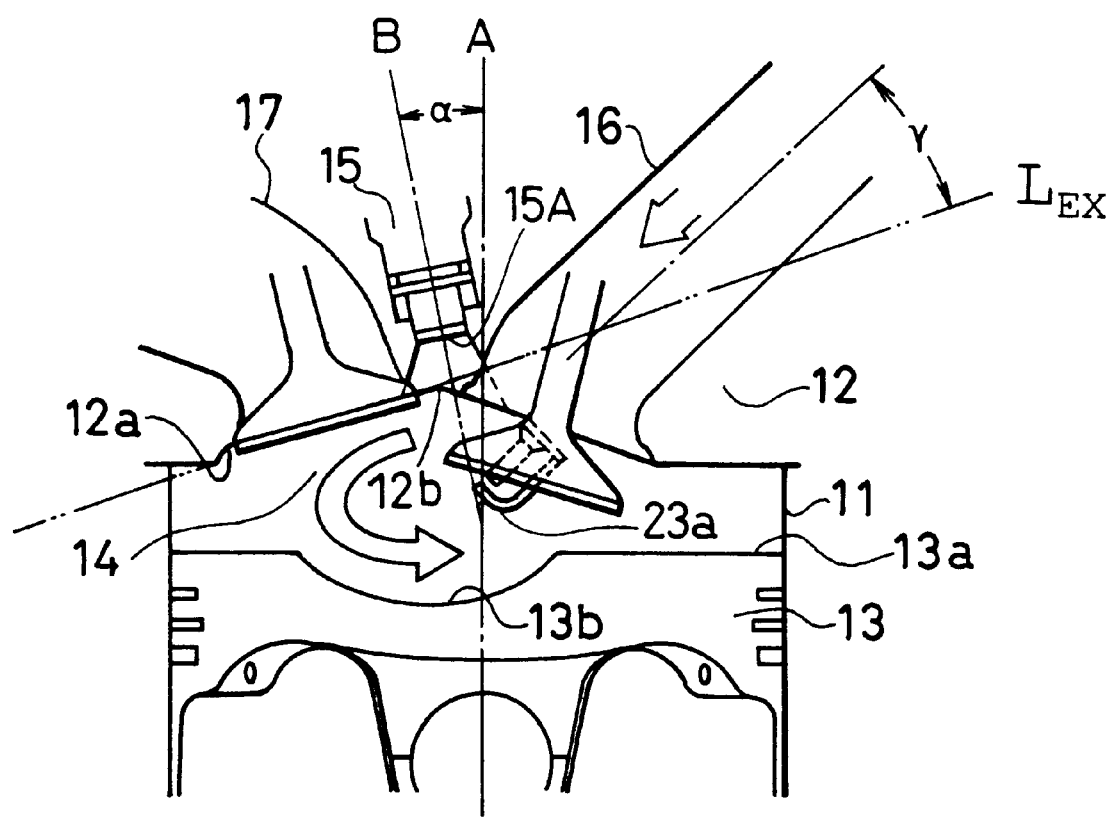
FIG. 1 is a schematic drawing showing a combustion chamber of an in-cylinder direct fuel injection spark ignition engine according to a first embodiment of the present invention.
Figure 2:
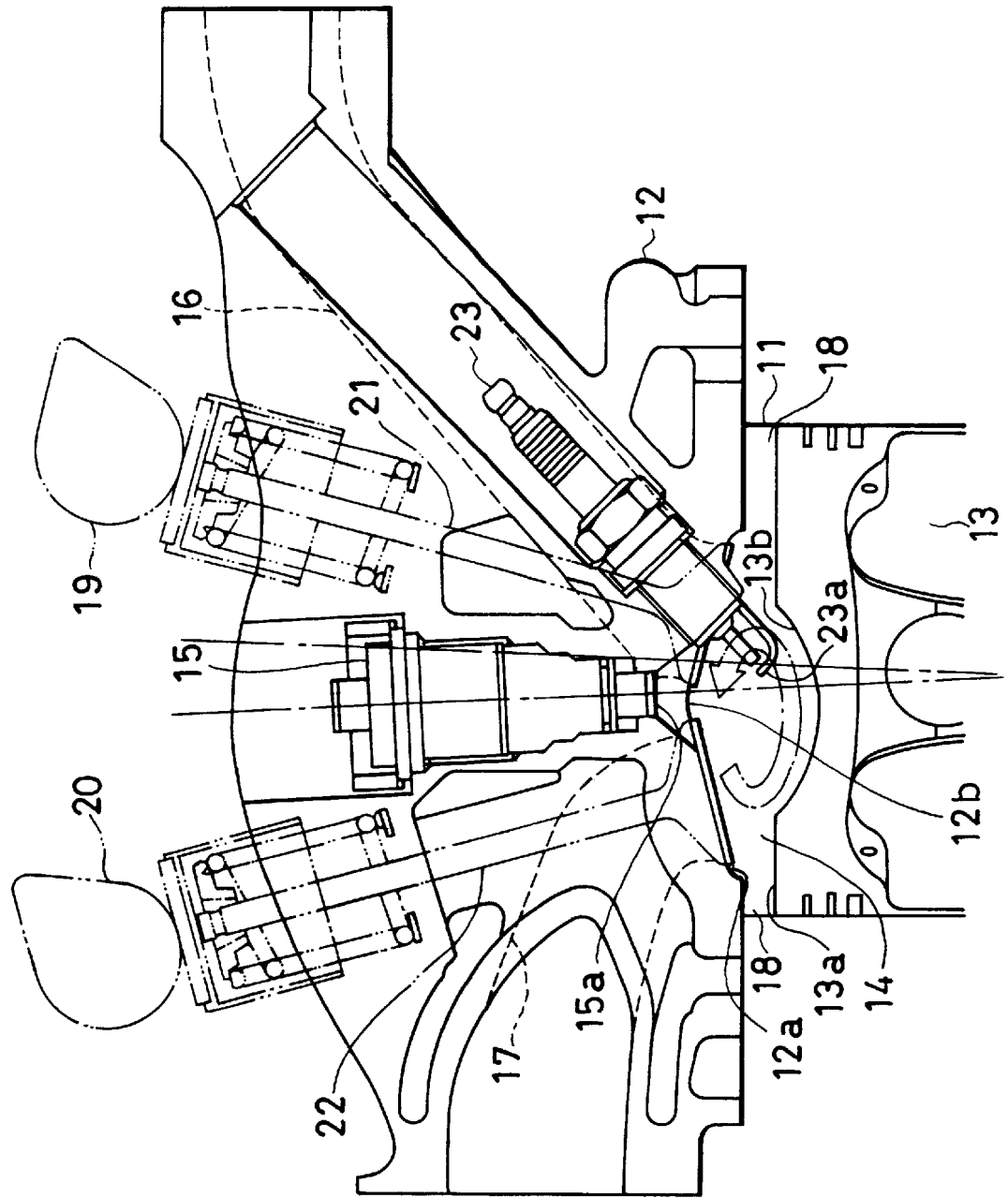
FIG. 2 is a side view showing a construction of a combustion chamber according to a first embodiment of the present invention.
Figure 3:
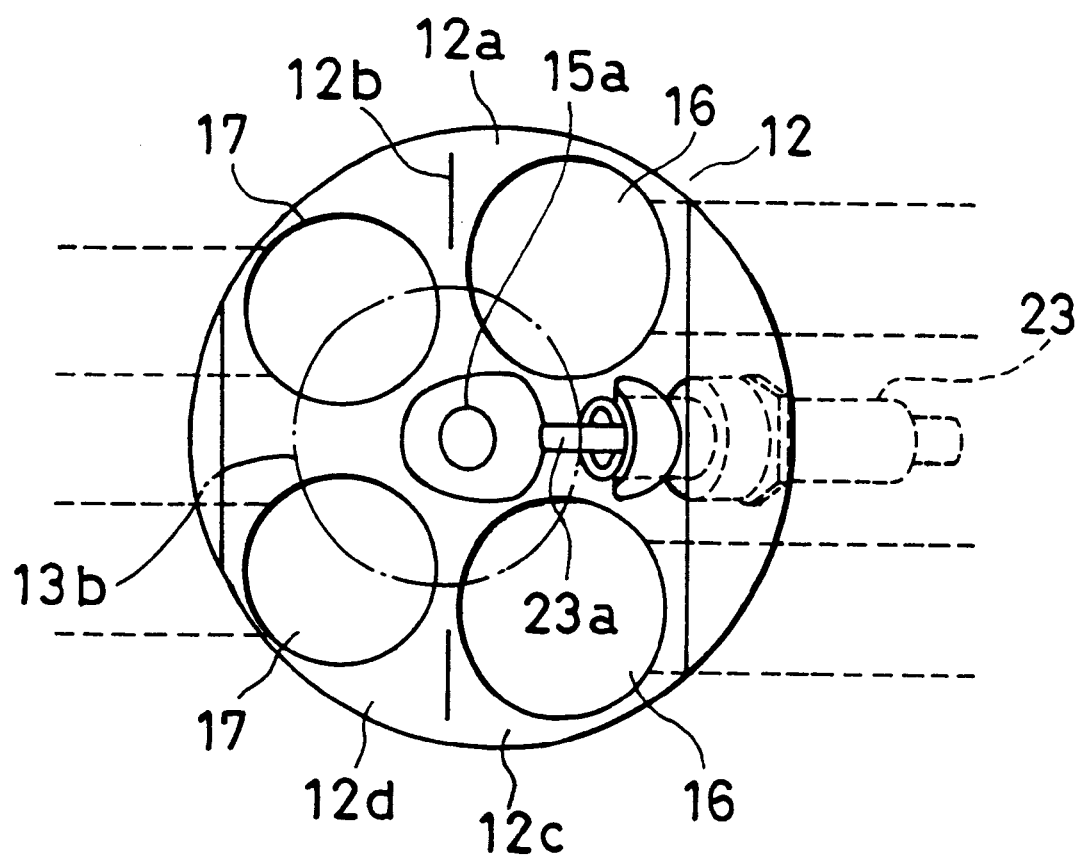
FIG. 3 is a top view of a combustion chamber according to a first embodiment of the present invention.
Figure 4:
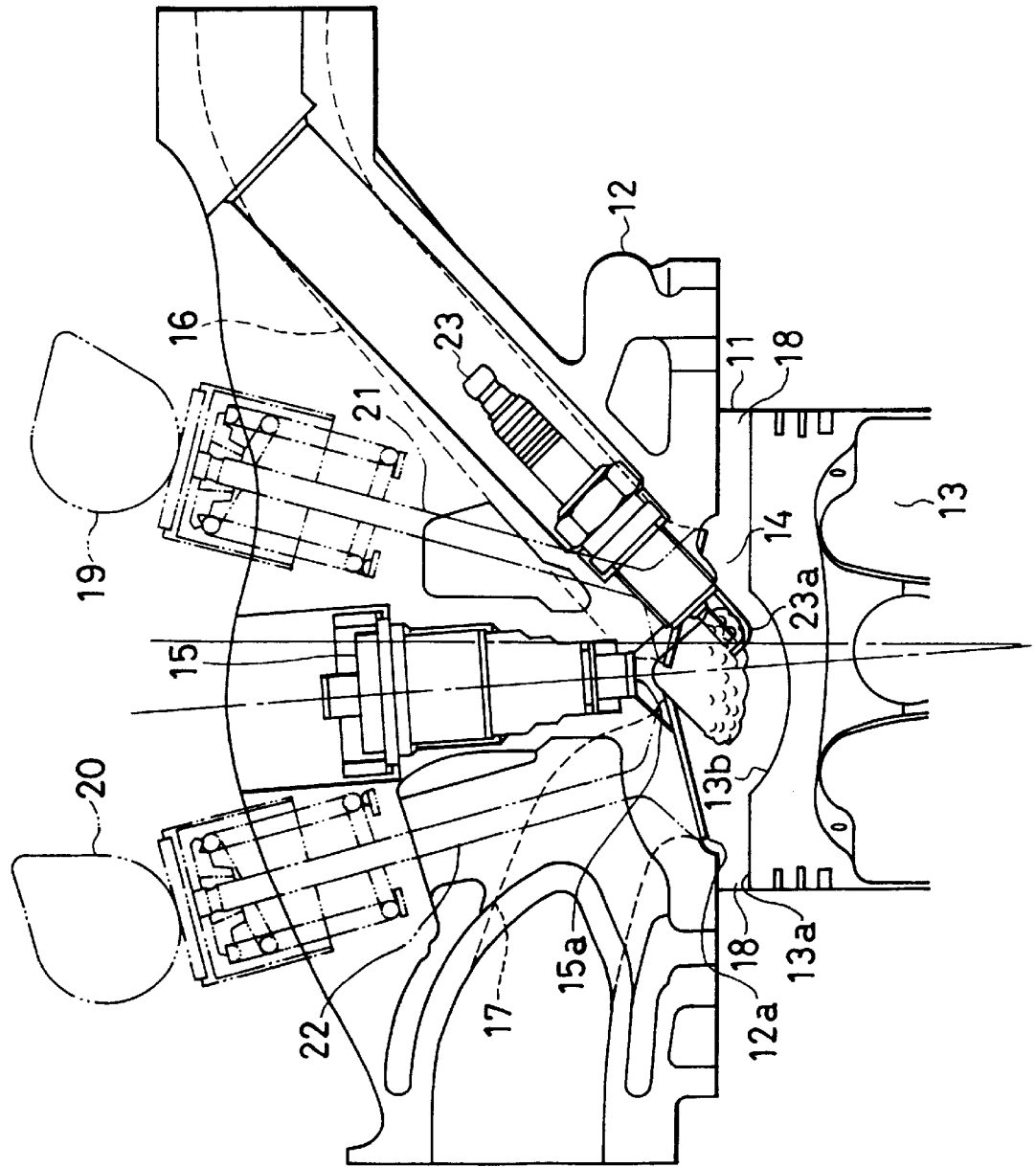
FIG. 4 is a side view showing a state of fuel spray immediately before ignition timing.

An example of a combustion chamber of an in-cylinder direct fuel injection engine is presented in FIG. 1 through FIG. 7. This example indicates a combustion chamber of a DOHC engine with four valves. In these drawings, numeral 11 denotes a cylinder, numeral 12 denotes a cylinder head, numeral 13 denotes a piston, and numeral 14 denotes a combustion chamber which is formed by a top surface 13a of the piston 13 positioned at the top dead center, an inner wall of the cylinder 11 and a bottom surface of the cylinder head 12.

A concave portion 12a is formed at the bottom surface of the cylinder head 12. The concave portion 12a belongs to a so-called pentroof type in this embodiment. As seen in FIG. 1, a top portion 12b is formed at the top of the concave 12a slightly away from the cylinder center (line A). A fuel injector 15 is disposed near the center of the top portion 12b with its nozzle 15a facing towards the combustion chamber 14. An intake port 16 is provided at the intake side pentroof 12c of the concave portion 12a, respectively, on both sides of the fuel injector 15, and an exhaust port 17 is provided at an exhaust side pentroof 12d of the concave 12a respectively on both sides of the fuel injector 15. Returning to FIG. 7, a squish area 18 is formed at the bottom of both pentroofs 12c, 12d.

An intake valve 21 and an exhaust valve 22 are provided in the intake port 16 and in the exhaust port 17, respectively. The intake valve 21 is driven by an intake cam 19 and the exhaust valve 22 is driven by an exhaust cam 20. As shown in FIG. 1, the intake port 16 has a straight shape and is provided in parallel with an extended line $L_{EX}$ of the exhaust side pentroof 12d or inclined at an acute angle $\tau$ upward (counterclockwise on the drawing) with respect to the extended line $L_{EX}$. Preferably the acute angle $\tau$ is in a range of 0 to 15 degrees. Intake air is guided through the thus constituted intake port 16 and flows into the combustion chamber 14 along the exhaust side pentroof 12d, causing a counterclockwise tumble flow in the combustion chamber 14, as shown in FIG. 1.

Further, in this embodiment, the fuel injector 15, whose center line is shown by a line B, is inclined toward the exhaust port 17 at an inclination angle $\alpha$ (counterclockwise on the drawing) with respect to the axis of the cylinder 11 shown as a line A so as to obtain more effective fuel spray. The angle $\alpha$ is preferably in a range of –5 to 20 degrees.

A cavity 13b with a curved surface is formed on the top surface 13a of the piston 13. The cavity 13b has such a shape and location as to be able to guide the tumble flow along the curved surface and to turn it toward the intake side pentroof 12c smoothly. As illustrated by a one-dot chain line in FIG. 3, the cavity 13b is located directly under the fuel injector 15 and at a position slightly offset to the side of the exhaust port 17.

An electrode 23a of a spark plug 23 is projected from the intake side pentroof 12c between the intake ports 16 and 16 so as to collide with the tumble flow reflected by the cavity 13b and to be exposed to fuel spray when fuel is injected.

Generally, there is an expert technical term, tumble rate, to express an intensity of tumble flow numerically. The tumble rate is defined as a number of rotations of intake air per one revolution of the crank shaft and it is determined depending on miscellaneous factors such as an inclination angle of the intake port 16, a configuration of the combustion chamber 14, a configuration of the piston 13 and the like. In this embodiment, the tumble rate is determined primarily by the inclination angle of the intake port 16, and the position and curvature of the cavity 13b of the piston 13. According to experiments by the inventors, tumble rates ranging from 0.5 to 1.7 produce the most favorable result. That is to say, taking a tumble rate smaller than 0.5, the tumble flow is decayed before the compression stroke, resulting in a failure to form a good air-fuel mixture. On the other hand, taking a tumble rate larger than 1.7, the tumble flow is so strong that intake air reflected from the cavity 13b of the piston 13 spreads around towards the cylinder wall, the resulting sprayed fuel is diffused in the stream of the scattering tumble flow and an ignitable air-fuel mixture is not formed around the electrode 23a of the spark plug 23. Consequently, it is desirable that the tumble rate be established within a range of 0.5 to 1.7.

Further, according to experiments by the inventors, it is known that the combination of an inclination angle $\alpha$ ranging from –5 to 20 degrees and an acute angle $\tau$ ranging from 0 to 15 degrees brings the most favorable effect to the formation of tumble flow. With respect to the size and location of the cavity 13b, it is known that its diameter d (millimeter) calculated according to the following formula bears a most favorable result.

$$d = D \times 0.5 - k$$

where D (millimeter) is a piston diameter and k is a constant (millimeter) ranging from 0 to 5 millimeters. Further, its depth e and its offset amounts from the cylinder axis should be values ranging from 5 to 10 millimeters and from 0 to 5 millimeters, respectively.

Next, an operation of this combustion chamber will be described.

Under stratified charge combustion at extremely low load, the engine is operated with the BITI control whereby a stable combustion is obtained. In this case, since the best fuel injection timing is set near the ignition timing, sprayed fuel itself makes an air-fuel mixture gas around the electrode 23a of the spark plug 23 and this mixture gas is ignited at the ignition timing. At extremely low load, gas speed is very low and therefore the air-fuel mixture is not affected by the configuration of the piston cavity 13b.

Figure 5:
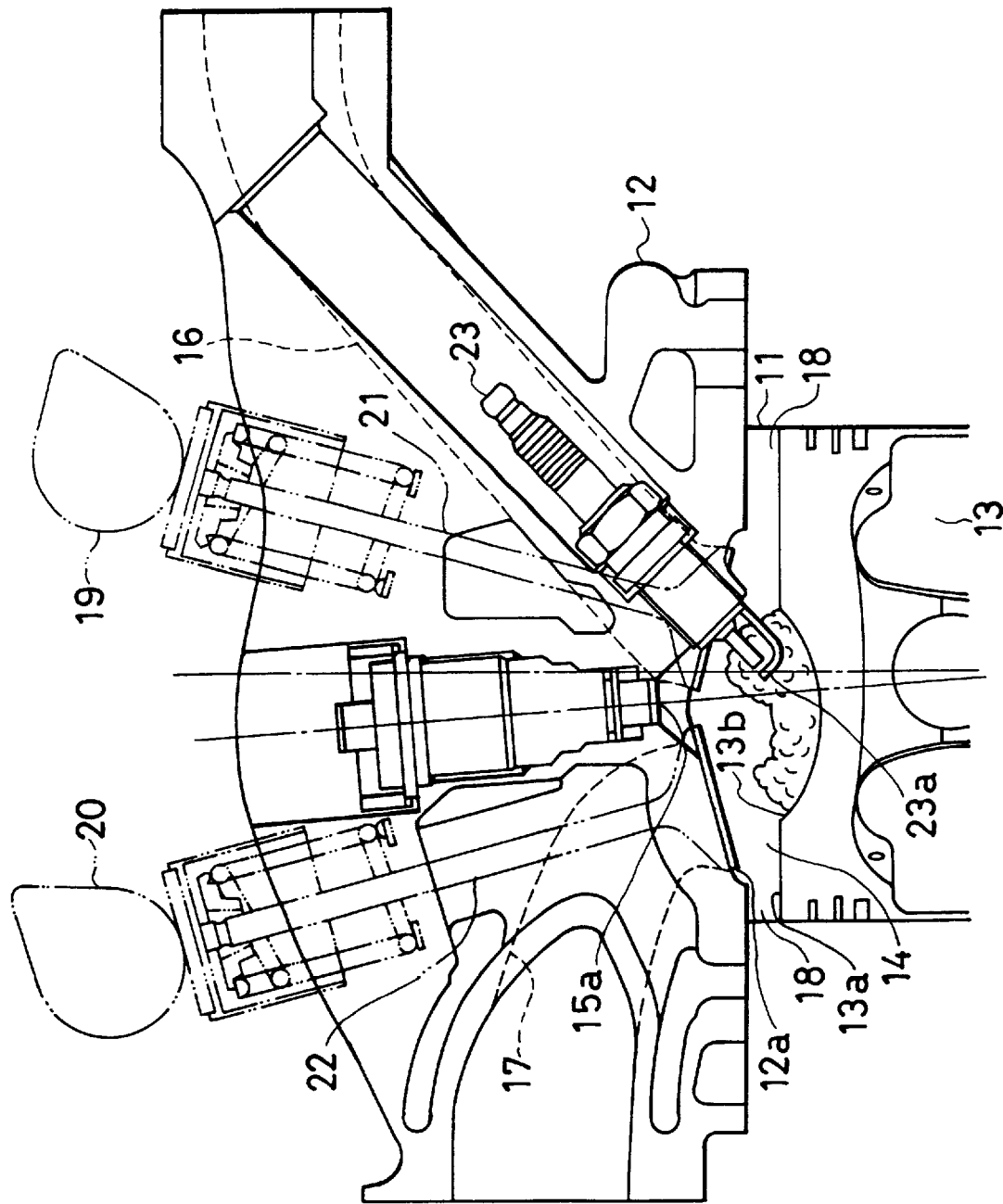
FIG. 5 is a side view showing a state of fuel spray impacted on a piston cavity.
Figure 8:
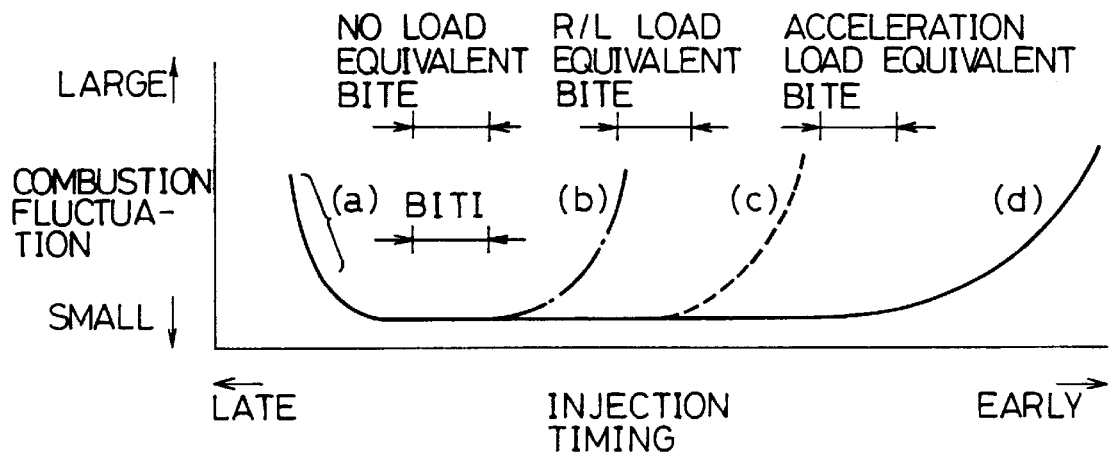
FIG. 8 is a diagram showing a relationship between combustion stability and injection timing.
Figure 15:
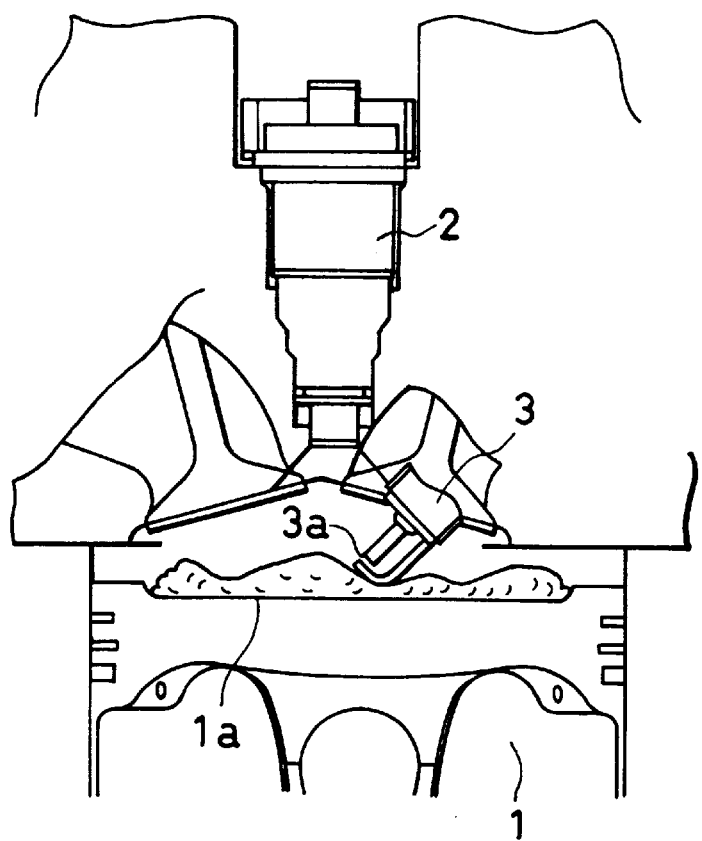
FIG. 15 is a schematic drawing showing a combustion chamber of an in-cylinder direct fuel injection spark ignition engine according to the prior art.

Further, at the BITE control equivalent to a constant speed running (R/L load), as shown in FIG. 8, fuel injection is finished earlier than with the BITI control, therefore, fuel spray at the end of injection is impacted on the piston cavity 13b and a flow of fuel spray curls up therefrom. Thus, an ignitable air-fuel mixture is formed around the electrode 13b of the spark plug 13, as illustrated in FIG. 5. A one-dot chain line (b) in FIG. 8 presents an ignitability of fuel injected at the same timing as in a case of a piston cavity with a flat surface (see FIG. 15). In the case of a piston with a flat surface, fuel spray is diffused around toward the cylinder bore without reflecting upward, and as a result, an ignitable mixture gas is not formed around the electrode 23a of the spark plug 23. Therefore, in this case the BITE control can not be conducted due to poor combustion.

Figure 6:
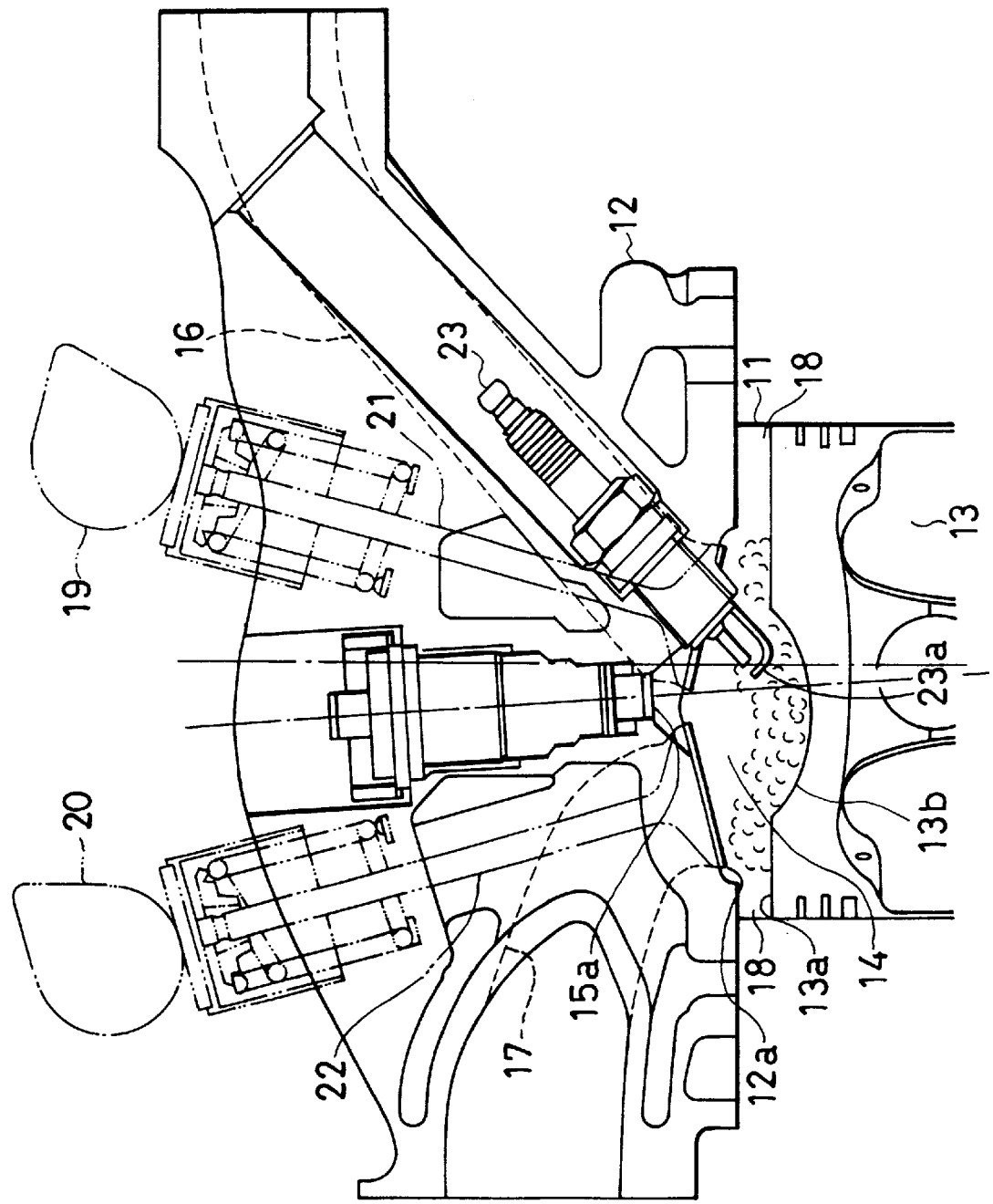
FIG. 6 is a side view showing a state of fuel spray when there is no tumble flow during acceleration.
Figure 7:
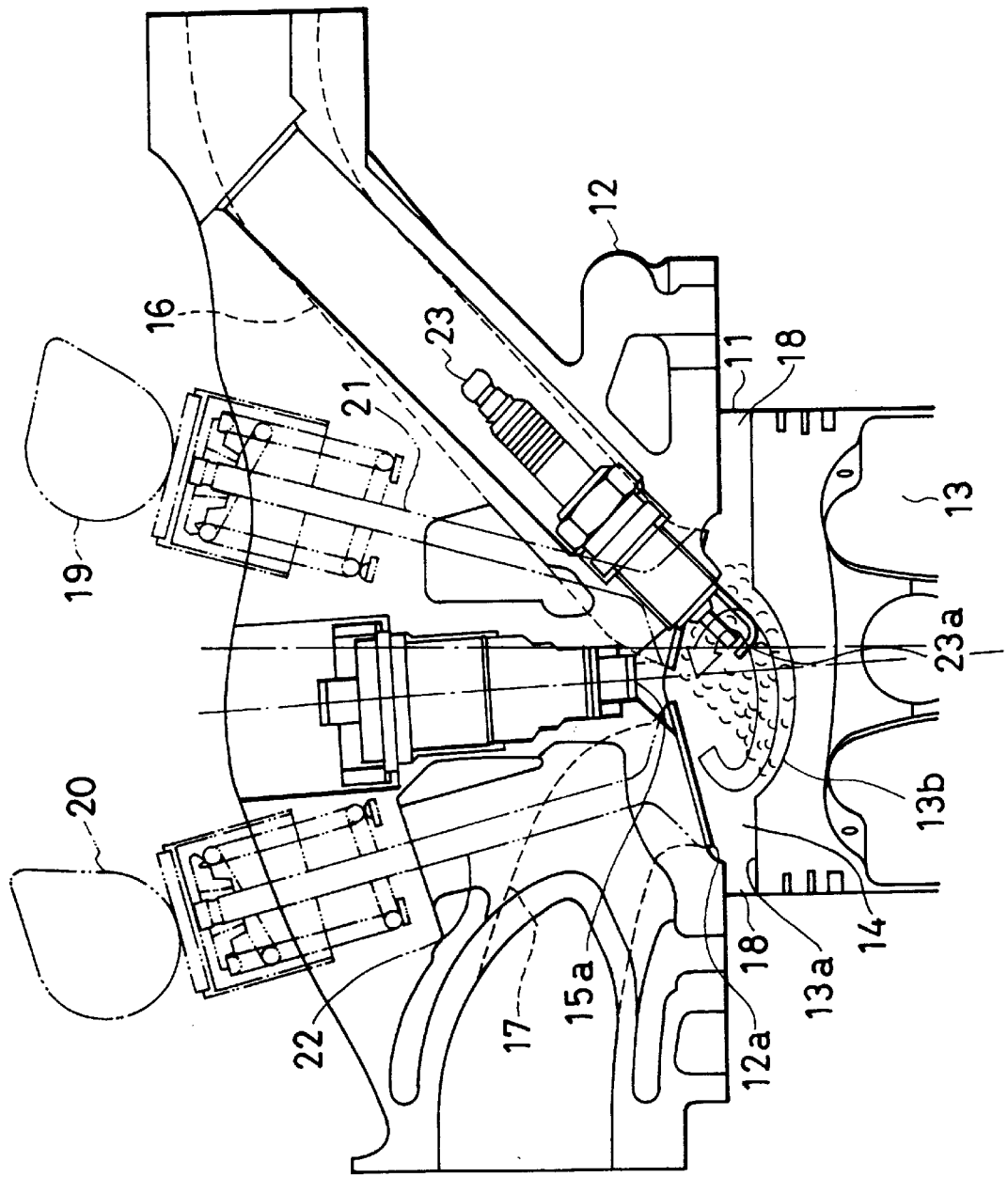
FIG. 7 is a side view showing a state of fuel spray when there occurs a tumble flow during acceleration.

Furthermore, at the BITE control equivalent to an acceleration load, the fuel injection finishing timing comes earlier as shown in FIG. 8. In this case, early injection timing fosters diffusion or vaporization of sprayed fuel. FIG. 6 indicates an example of the combustion chamber in which air-fuel mixtures lie on the overall surface of the piston cavity 13b. If a tumble flow is given to this state, these air-fuel mixtures curl up toward the electrode 23a of the spark plug 23, forming an ignitable mixture gas around the electrode 23a just when ignition is applied. Thus, as shown in FIG. 8, the BITE control is available even when ignition is applied early during acceleration equivalency. Accordingly, with this embodiment, combustion can be kept stable over a broad area ranging from the misfiring limit (a) on the late side to the misfiring limit (d) on the early side. The misfiring limit (a) is a limit line whose left area indicates an area causing misfire due to the proximity of the injection timing to the ignition timing, namely, due to the breakage of discharge passes of the spark plug 23 by fuel spray.

FIG. 10a through FIG. 10d show examples of comparison data between a piston with a flat top surface and a piston with a curved cavity for combustion or emissions characteristics.

As understood from those comparison data, in case of a piston with a curved cavity, establishing the fuel injection finishing timing early has no adverse effect on combustion until a rather early timing. In this case the fuel injection timing can be established within a broad range. On the other hand, in case of a piston with a flat top surface an early establishment of the fuel injection finishing timing incurs poor combustion or misfire because an ignitable air-fuel mixture gas is not formed around the electrode of the spark plug. Consequently, in this case, the selectable range of the fuel injection finishing timing is very narrow.

Referring to FIG. 11a through FIG. 11d, these drawings show differences of combustion and emissions characteristics with respect to a rotational direction of tumble flow and a tumble rate.

Comparing the tumble flow rotating in the direction of this embodiment with the one rotating in an inverse direction, the tumble flow having an inverse rotational direction is proved to be inferior in the aspect of ignitability for the reason that the inverse tumble flow blows out fuel spray in an opposite direction to the electrode of the spark plug. This tendency becomes more pronounced as the fuel injection timing becomes earlier. With respect to an effect of tumble rate, it is proved that there is a certain optimal value in the tumble rate. According to experiments by the inventors, it has been proved that the optimal value of tumble rate is 1.0 in case of configurations of the combustion chamber and the piston cited in this embodiment. Further it has been proved that a stable ignition can be obtained within a range of 0.5 to 1.7 of tumble rate. That is to say, if the tumble rate is smaller than 0.5, it is proved that the tumble flow is deteriorated before reaching the compression stroke, having no use in the formation of air-fuel mixture. Further, if the tumble rate is larger than 2.0, it is proved that the tumble flow is so strong that fuel spray is diffused and as a result an ignitable air-fuel mixture is not formed around the electrode of the spark plug.

Figure 9:
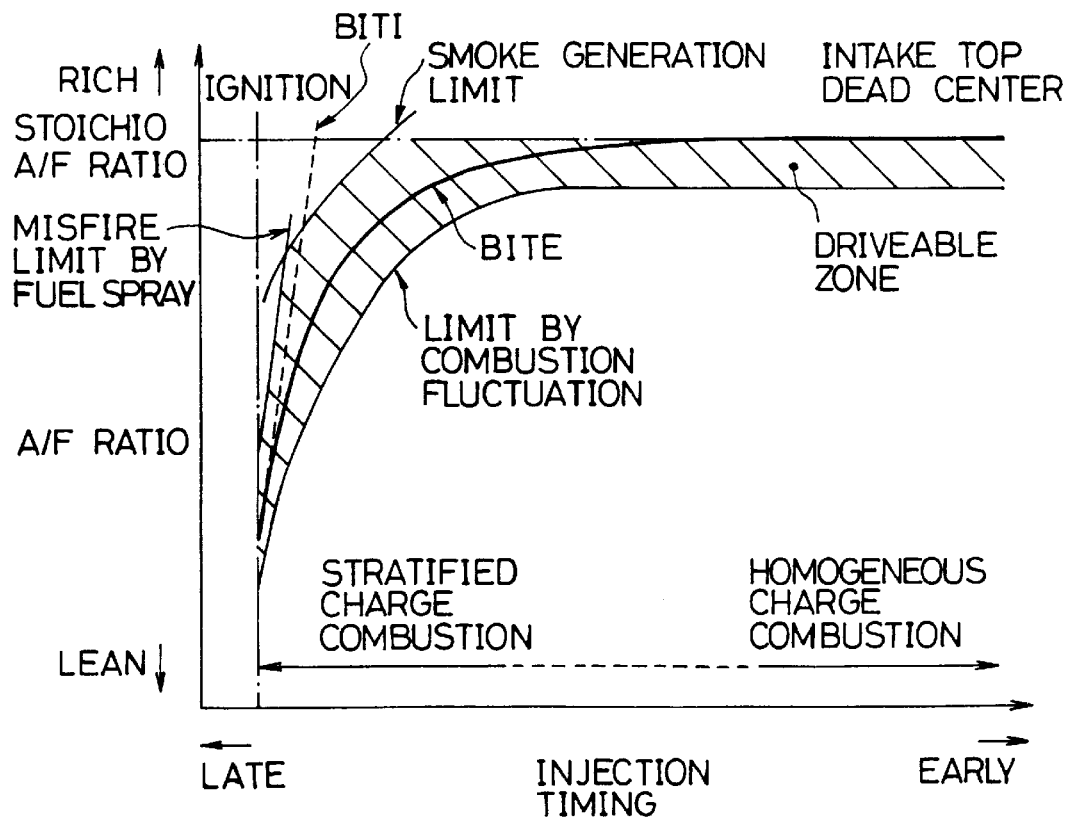
FIG. 9 is a diagram showing a relationship between a driveable zone and a best injection timing.
Figure 10A:
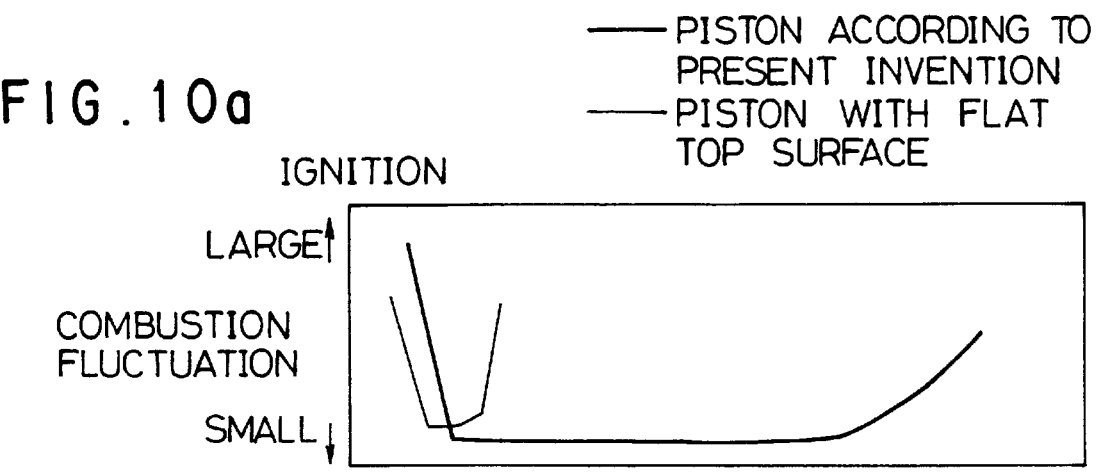
FIG. 10a is a diagram showing a comparison of a rate of combustion fluctuation between a piston with a flat top surface and a piston with a curved cavity.
Figure 10B:
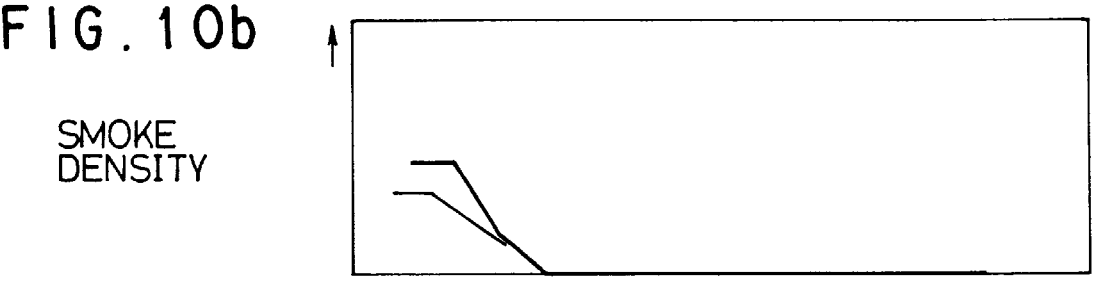
FIG. 10b is a diagram showing a comparison of a smoke density between a piston with a flat top surface and a piston with a curved cavity.
Figure 10C:
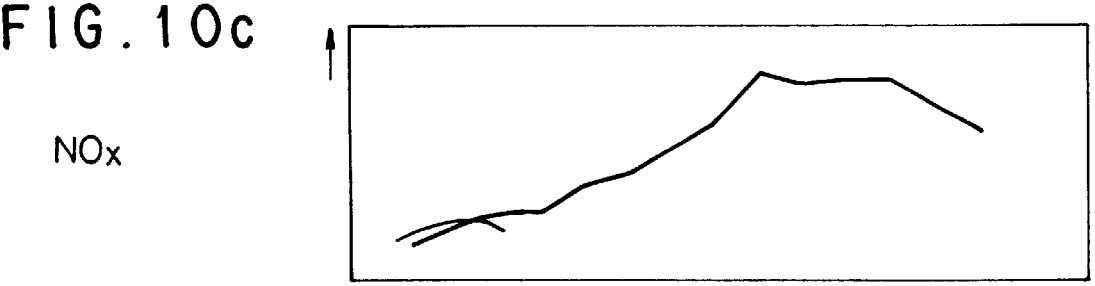
FIG. 10c is a diagram showing a comparison of NOx emissions between a piston with a flat top surface and a piston with a curved cavity.
Figure 10D:
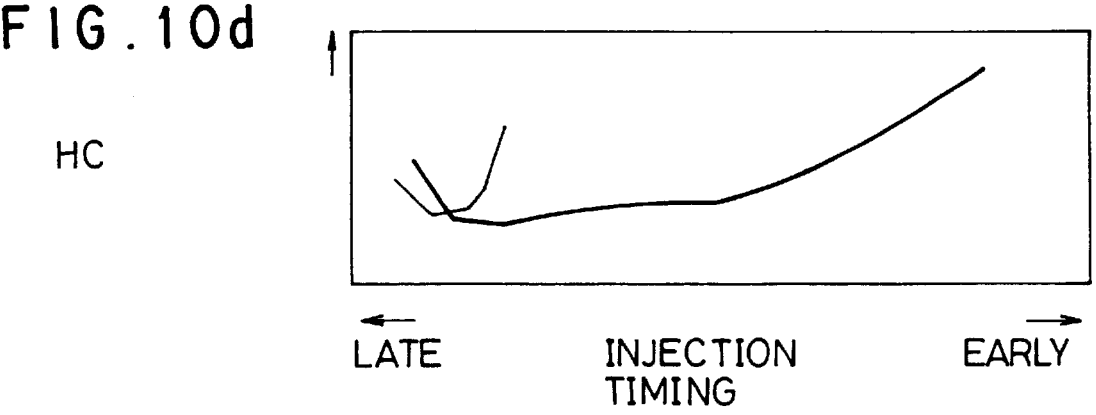
FIG. 10d is a diagram showing a comparison of HC emissions between a piston with a flat top surface and a piston with a curved cavity.

FIG. 9 shows a driveable range of air-fuel ratio versus the fuel injection timing by slanting lines when the BITE control is conducted. The air-fuel ratio and the fuel injection finishing timing in each driving area is determined by miscellaneous limits such as discharge pass breakage by fuel spray, a generation of smoke, a combustion fluctuation and the like. As understood from this diagram, if the air-fuel ratio and the injection timing is within this driveable range, the BITE control can be retained and the air-fuel ratio can be changed continuously, ranging from the stratified charge combustion to the homogeneous charge combustion, without having an adverse effect on the ignitability and combustibility of the engine.

Figure 12:
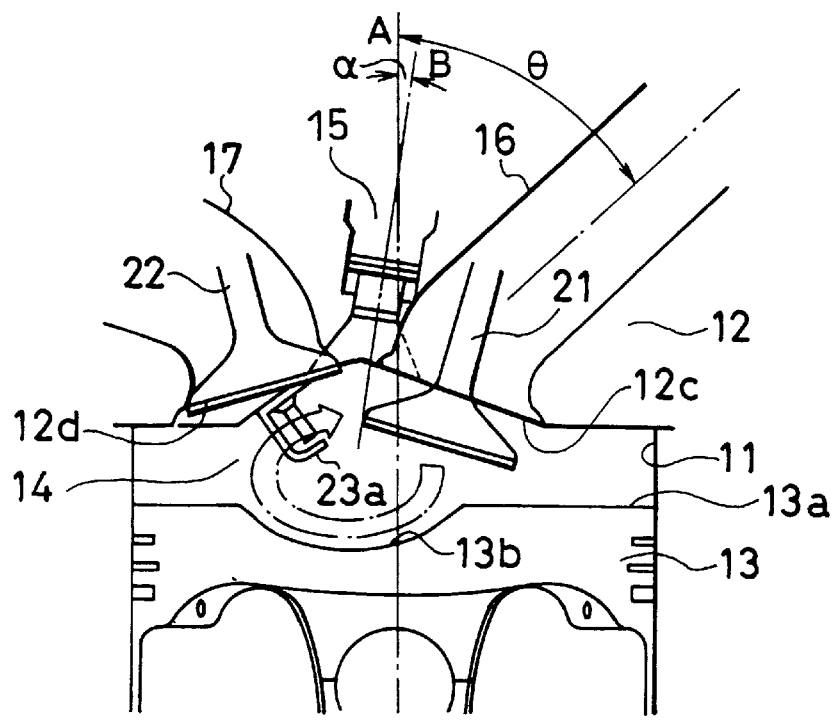
FIG. 12 is schematic drawing showing a combustion chamber according to a second embodiment of the present invention.
Figure 13:
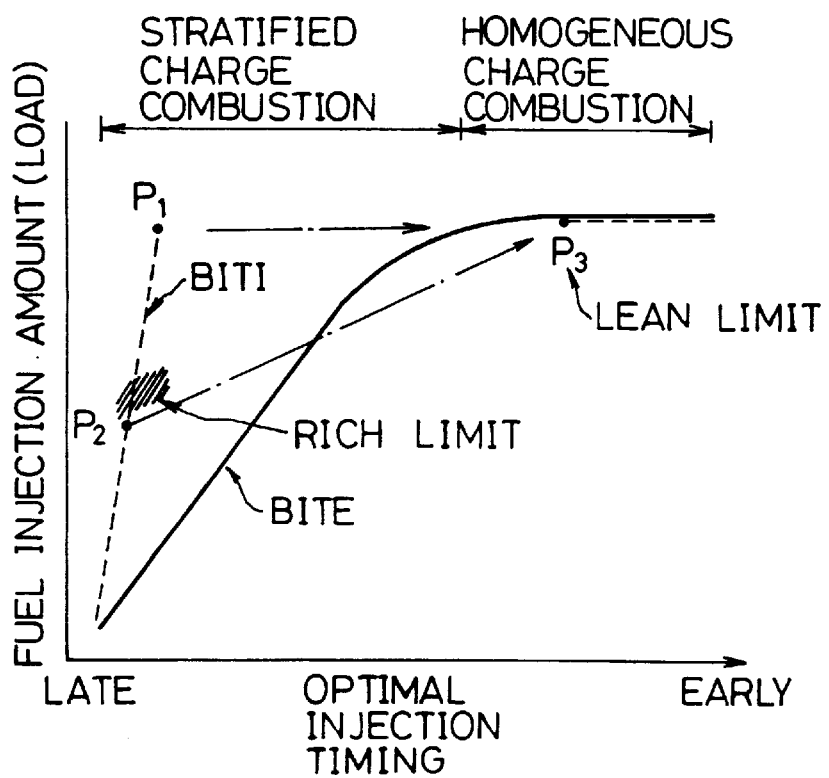
FIG. 13 is a diagram showing a relationship between fuel injection finishing timing and fuel injection amount according to the prior art.
Figure 14:
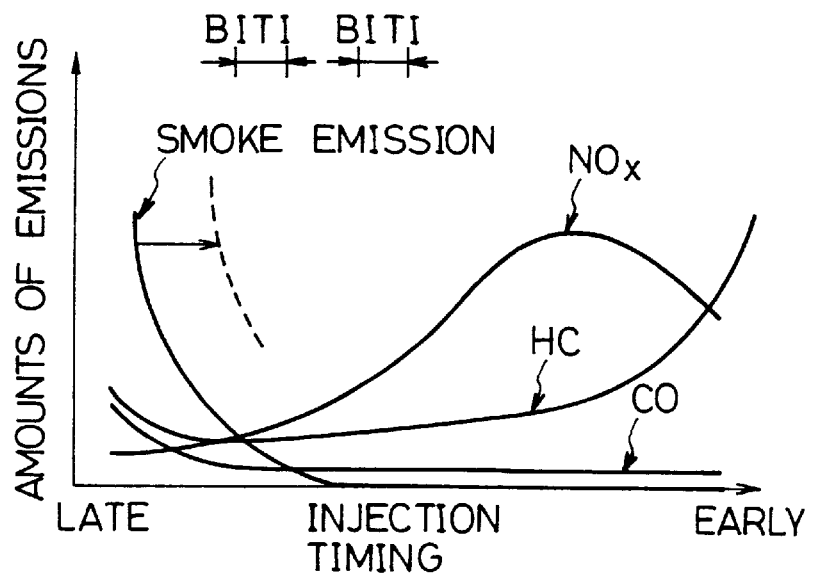
FIG. 14 is a diagram showing a relationship between the amount of emissions and fuel injection timing.

FIG. 12 depicts a second embodiment according to the present invention.

In the second embodiment, the spark plug 23 is relocated from the intake port side to the exhaust port side 17 and its electrode 23a is projected into the combustion chamber 14 from between two exhaust valves 22 and 22. In this case, since an inclination angle θ (clockwise on the drawing) of the intake port 16 with respect to the cylinder axis is designed to be smaller than that of the first embodiment, the tumble flow is generated in an adverse direction to the tumble direction according to the first embodiment, i.e., in a clockwise direction as shown in FIG. 12. Preferably the angle θ is in a range of 0 to 20 degrees. That is, the intake air introduced through the intake valve 21 first hits the top surface 13a of the piston 13 and then the tumble flow is generated by the piston cavity 13b of the piston 13. The tumble flow curls up from the piston cavity 13b in the direction of the pentroof 12d of the exhaust side. The fuel spray injected from the fuel injector 15 collides with the tumble flow and forms air-fuel mixtures. In this embodiment, the fuel injector is inclined at an inclination angle α slightly toward the intake port 16 so as to obtain more effective fuel spray. In this embodiment, the inclination angle α of the fuel injector 25 is preferably in a range of −20 to 5 degrees. Thus, ignitable mixture gas is formed around the electrode 23a of the spark plug 23.

This disposition of the spark plug 23 on the exhaust port side has an advantage of being able to enlarge the diameter of the intake valve, compared to the first embodiment. In this embodiment too, it is desirable that the tumble rate is established to be a value ranging from 0.5 to 1.7.

In summary, according to the first embodiment of the present invention, intake air introduced into the combustion chamber is guided along the pentroof on the exhaust port side and then after colliding with the curved piston cavity on the top of the piston, the tumble flow curls up toward the vicinity of the electrode of the spark plug. On the other hand, according to the second embodiment, intake air introduced into the combustion chamber and then after directly colliding with the curved piston cavity, the tumble flow curls up toward the vicinity of the electrode of the spark plug. When the injection timing is relatively late, i.e., when it is relatively close to the ignition timing (stratified charge combustion area), air-fuel mixture is formed in the vicinity of the electrode of the spark plug by the sprayed fuel itself and that mixture gas is ignited by the spark plug. When the injection timing is relatively early, i.e., when it is relatively far from the ignition timing (stratified charge combustion area), sprayed fuel is reflected by the piston cavity and the reflected fuel spray forms mixture gas around the electrode of the spark plug. Then, the mixture gas is ignited at the specified ignition timing. When the injection timing is further earlier (in this area, there is a stratified charge combustion at the early stage and there is a homogeneous charge combustion at the latter stage), sprayed fuel is trapped by the piston cavity, the trapped fuel is mixed with the rising tumble flow and the mixture gas reaches the vicinity of the electrode of the spark plug. Then, the mixture gas is ignited at the specified ignition timing. The transfer from stratified charge combustion to homogeneous charge combustion is continuously carried out. Thus, throughout all operating conditions of engine, a stable ignitability and a stable combustion performance can be secured. The stable combustion leads to the suppression of unacceptable HC, CO, NOx and smoke emissions and the smooth transfer from stratified charge combustion to homogeneous charge combustion, which contributes to good driveability.

Further, by means of establishing the rotational number of the tumble flow per one engine revolution between 0.5 and 1.7, ignitable air-fuel mixture is secured around the electrode of the spark plug so as not to deteriorate the tumble flow during the compression stroke and further not to diffuse fuel around.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A combustion chamber of an in-cylinder direct fuel injection spark ignition engine comprising:

a roof having an intake valve side and an exhaust valve side, an intake port provided on the intake valve side of the roof at an acute angle including zero degrees upward with respect to an extended line from said exhaust valve side of the roof so as to form a tumble flow of intake air along the exhaust valve side of the roof, an intake valve provided in the intake port for introducing intake air into the combustion chamber, an exhaust valve provided at the exhaust valve side of the roof for discharging exhaust gas from the combustion chamber, a cylinder, a fuel injector disposed between the intake valve side of the roof and the exhaust valve side of the roof and inclined at a first inclination angle toward the exhaust valve side of the roof with respect to an axis of the cylinder, a piston provided in the cylinder, the piston having a top surface defining a piston cavity therein, the piston cavity being curved so as to reflect fuel spray injected from the fuel injector together with the tumble flow of the intake air in the direction of the intake valve side of the roof to gather reflected fuel spray at the intake valve side of the combustion chamber, and a single spark plug having an electrode projecting from the intake valve side of the roof toward the piston cavity so as to be exposed to the tumble flow and the fuel spray reflected by the piston cavity.

2. The combustion chamber according to claim 1, wherein said tumble flow is rotated at a rotation amount ranging from 0.5 to 1.7 per one rotation of said engine.

3. The combustion chamber according to claim 1, wherein said first inclination angle ranges from −5 to 20 degrees.

4. The combustion chamber according to claim 1, wherein said acute angle ranges from 0 to 15 degrees.

5. A combustion chamber of an in-cylinder direct fuel injection spark ignition engine comprising:

a roof having an intake valve side and an exhaust valve side, an exhaust valve provided at the exhaust valve side of the roof for discharging exhaust gas from the combustion chamber, a cylinder, a piston provided in the cylinder, a fuel injector disposed between the intake valve side of the roof and the exhaust valve side of the roof and inclined at a first inclination angle toward the intake valve side of the roof with respect to an axis of the cylinder, an intake port provided on the intake valve side of the roof at a second inclination angle with respect to an axis of the cylinder so as to impinge the intake air against the piston and form a tumble flow of the intake air, an intake valve provided in the intake port for introducing the intake air into the combustion chamber, the piston having a top surface defining a piston cavity therein, the piston cavity being curved so as to reflect a fuel spray injected from the fuel injector together with the tumble flow of the intake air in the direction of the exhaust valve side of the roof, and a spark plug having an electrode projecting from the exhaust valve side of the roof so as to be exposed to said tumble flow and said fuel spray reflected by said piston cavity.

6. The combustion chamber according to claim 5, wherein said tumble flow is rotated at a rotation amount ranging from 0.5 to 1.7 per one rotation of said engine.

7. The combustion chamber according to claim 5, wherein said first inclination angle ranges from −20 to 5 degrees.

8. The combustion chamber according to claim 5, wherein said second inclination angle ranges from 0 to 20 degrees.

* * * * *